United States Patent
Takada et al.

(10) Patent No.: US 8,610,399 B2
(45) Date of Patent: Dec. 17, 2013

(54) RESONANCE TYPE NON-CONTACT POWER SUPPLY SYSTEM FOR VEHICLE AND ELECTRIC VEHICLE

(75) Inventors: Kazuyoshi Takada, Kariya (JP); Sadanori Suzuki, Kariya (JP); Shimpei Sakoda, Kariya (JP); Yukihiro Yamamoto, Kariya (JP); Shinji Ichikawa, Toyota (JP); Toru Nakamura, Toyota (JP)

(73) Assignees: Kabushiki Kaisha Toyota Jidoshokki (JP); Toyota Jidosha Kabushiki Kaisha (JP)

( * ) Notice: Subject to any disclaimer, the term of this patent is extended or adjusted under 35 U.S.C. 154(b) by 354 days.

(21) Appl. No.: 13/191,649

(22) Filed: Jul. 27, 2011

(65) Prior Publication Data

US 2012/0025761 A1    Feb. 2, 2012

(30) Foreign Application Priority Data

Jul. 29, 2010  (JP) ................................. 2010-170594

(51) Int. Cl.
*H02J 7/00* (2006.01)

(52) U.S. Cl.
USPC .......................................... 320/108; 320/137

(58) Field of Classification Search
USPC ....................................................... 320/108
See application file for complete search history.

(56) References Cited

U.S. PATENT DOCUMENTS

| | | | | |
|---|---|---|---|---|
| 4,951,199 A | * | 8/1990 | Whitehead | 701/41 |
| 5,462,439 A | * | 10/1995 | Keith | 320/109 |
| 5,612,606 A | * | 3/1997 | Guimarin et al. | 320/109 |
| 5,821,731 A | * | 10/1998 | Kuki et al. | 320/108 |
| 7,004,710 B1 | * | 2/2006 | Quade | 414/395 |
| 7,719,229 B2 | * | 5/2010 | Kaneko et al. | 320/113 |
| 8,212,521 B2 | * | 7/2012 | Choi | 320/114 |
| 2009/0121678 A1 | * | 5/2009 | Mitake et al. | 320/109 |
| 2010/0263158 A1 | * | 10/2010 | Jones et al. | 15/319 |
| 2011/0121778 A1 | | 5/2011 | Oyobe et al. | |

FOREIGN PATENT DOCUMENTS

| | | |
|---|---|---|
| JP | 2001-177916 | 6/2001 |
| JP | 2004-229421 | 8/2004 |
| JP | 2008120357 A | 5/2008 |
| JP | 2009106136 A | 5/2009 |
| JP | 2010-158151 | 7/2010 |
| JP | 2010170594 A | 8/2010 |
| JP | 2010-246348 | 10/2010 |

* cited by examiner

*Primary Examiner* — Arun Williams
(74) *Attorney, Agent, or Firm* — Woodcock Washburn LLP

(57) ABSTRACT

A resonance type non-contact power supply system is provided that includes power supplying equipment and an electric vehicle. The power supply equipment includes an alternating-current power source and a primary-side resonance coil for receiving power from the alternating-current power source. The electric vehicle includes power receiving equipment and a vehicle height control device mounted on the electric vehicle. The power receiving equipment includes a secondary-side resonance coil that receives power from the primary-side resonance coil, a rectifier that rectifies the power received by the secondary-side resonance coil, and an electrical storage device, to which the power rectified by the rectifier is supplied. A resonance system that includes the primary-side resonance coil and the secondary-side resonance coil is configured such that impedance thereof is adjusted by the use of the vehicle height control device when the electrical storage device is charged.

7 Claims, 1 Drawing Sheet

RESONANCE TYPE NON-CONTACT POWER SUPPLY SYSTEM FOR VEHICLE AND ELECTRIC VEHICLE

CROSS REFERENCE TO RELATED APPLICATIONS

This application claims priority to Japanese Application No. 2010-170594 filed Jul. 27, 2010.

TECHNICAL FIELD

The present invention relates to a resonance type non-contact power supply system and an electric vehicle. More specifically, the present invention relates to a resonance type non-contact power supply system for a vehicle that is suitable for non-contact charging of an electrical storage device mounted on a vehicle having vehicle height control devices.

BACKGROUND

Japanese Laid-Open Patent Publication No. 2009-106136 discloses a charging system in which a vehicle mounted electrical storage device is charged by a power source outside the vehicle through wireless reception of charging power through the resonance method. Specifically, the charging system of the above document includes an electric vehicle and a power supply device. The electric vehicle has a secondary self-resonance coil, which is a secondary-side resonance coil, a secondary coil, a rectifier, and an electrical storage device. The power supply device has a high-frequency power driver, a primary coil, and a primary self-resonance coil, which is a primary-side resonance coil. The number of turns of the secondary self-resonance coil is determined based on the voltage of the electrical storage device, the distance between the primary self-resonance coil and the secondary self-resonance coil, and the resonant frequency of the primary self-resonance coil and the secondary self-resonance coil. The distance between the power supply device and the vehicle changes depending on the conditions of the vehicle, for example, the loading state and the tire air pressure. Changes in the distance between the primary self-resonance coil of the power supply device and the secondary self-resonance coil of the vehicle change the resonant frequency of the primary self-resonance coil and the secondary self-resonance coil. Therefore, according to the above document, a variable capacitor is connected between the ends of the wire forming the secondary self-resonance coil. When charging an electrical storage device, the charging system calculates the charging power of the electrical storage device based on detection values of a voltage sensor and a current sensor, and adjusts the capacitance of the variable capacitor of the secondary self-resonance coil such that the charging power is maximized. The above document discloses that the LC resonant frequency of the secondary self-resonance coil is adjusted in this manner.

Japanese Laid-Open Patent Publication No. 2008-120357 discloses a non-contact power supply device for a moving body. The non-contact power supply device supplies power, without contact, to a power receiving portion of a moving body from a power supply portion through electromagnetic induction. The power supply portion of the non-contact power supply device is installed on the surface of a road on which the moving body travels. The power receiving portion is provided at such a position that, when the moving body is stopped at the position where the power supply portion is installed, the power receiving portion faces the power supply portion with a predetermined space in between. The non-contact power supply device has a simple movable device for moving the power receiving portion vertically. This allows the distance between the power receiving portion and the power supply portion to be finely adjusted.

Japanese Laid-Open Patent Publication No. 2009-106136 discloses a method described below for efficiently supplying power from the power supplying side to the power receiving side. That is, even when the distance between the primary self-resonance coil and the secondary self-resonance coil changes due to the condition of the vehicle, for example, the loading state or the tire air pressure, the capacitance of the variable capacitor of the secondary self-resonance coil is adjusted such that the charging power of the electrical storage device is maximized when the electrical storage device is charged. However, according to this power supplying method, the impedance is adjusted only the variable capacitor. Therefore, if the required adjustment is large, the size of the variable capacitor has to be increased.

As described above, the non-contact power supply device disclosed in Japanese Laid-Open Patent Publication No. 2008-120357 supplies power without contact through electromagnetic induction. In the case of electromagnetic induction, a power supply portion and a power receiving portion can be moved simply closer to each other. However, in the case of a resonance type non-contact power supply, the distance between a power supply portion and a power receiving portion needs to be adequate. In other words, in the case of the resonance type non-contact power supply, the distance between the power supply portion and the power receiving portion cannot be positioned at an adequate distance simply by bringing the power supply portion and the power receiving portion close to each other.

SUMMARY

Accordingly, it is an objective of the present invention to provide a resonance type non-contact power supply system for supplying power to an electric vehicle without contacting the electric vehicle in which the vehicle includes a height control feature for adjusting height, and uses the height control feature to efficiently supply power from the power supplying side to the power receiving side.

To achieve the foregoing objective and in accordance with one aspect of the present invention, a resonance type non-contact power supply system includes power supplying equipment and an electric vehicle. The power supply equipment includes an alternating-current power source and a primary-side resonance coil for receiving power from the alternating-current power source. The electric vehicle mounts power receiving equipment and a vehicle height control device. The power receiving equipment includes a secondary-side resonance coil that receives power from the primary-side resonance coil, a rectifier that rectifies the power received by the secondary-side resonance coil, and an electrical storage device, to which the power rectified by the rectifier is supplied. A resonance system that includes the primary-side resonance coil and the secondary-side resonance coil is configured such that the impedance is adjusted by the use of the vehicle height control device when the electrical storage device is charged.

In the present description, an "electric vehicle" refers to a vehicle having an electric motor that generates driving force. Examples of such an electric vehicle include electric automobiles, hybrid vehicles having, as a drive source, an internal combustion engine as well as an electric motor, and vehicles that mount a fuel cell as well as a secondary battery as a direct-current power source for driving the vehicle. An "electrical storage device" refers to a direct-current power source capable of being charged and discharged. That is, the electrical storage device is not limited to a secondary battery, but may be a capacitor of a large capacitance.

A "resonance system" includes a primary-side resonance coil and a secondary-side resonance coil. The resonance system further has circuit components. The circuit components include a matching unit and a secondary coil, which are located between a distance detection high-frequency power source and a secondary-side resonance coil when the power receiving equipment detects the distance between the primary-side resonance coil and the secondary-side resonance coil. The circuit components also include a primary coil and a matching unit, which are located between the primary-side resonance coil of the power supply equipment and the alternating-current power source. The circuit components of the resonance system also include a matching unit and a primary coil, which are located between the alternating current power source and the primary-side resonance coil when the secondary-side resonance coil receives power from the primary-side resonance coil. The circuit components further include a rectifier that receives power from the secondary-side resonance coil, a charger, an electrical storage device, and a matching unit and a secondary coil, which are located between the secondary resonance coil and the rectifier.

When the electric vehicle receives power from the power supply equipment to charge the electrical storage device, it is best to stop the electric vehicle at a position where the distance between the primary-side resonance coil and the secondary-side resonance coil is equal to a predetermined distance. At charging, the position of the primary-side resonance coil in the power supply equipment is constant. In contrast, the position of the secondary-side resonance coil in the electric vehicle changes according to the stop position of the electric vehicle or the condition of the electric vehicle such as the loading state and the tire air pressure. Accordingly, in the present invention, at charging from the power supply equipment to the electrical storage device, the vehicle height control device is activated after the electric vehicle is stopped at a parking (stop) position that is set in the power supply equipment. The height of the electric vehicle is adjusted such that the impedance of the resonance system is in a state where the electric vehicle can efficiently receive power from the power supplying side. Thus, even if the condition of the electric vehicle, for example, the loading state or the tire air pressure vary, power can be efficiently sent from the power supplying side to the power receiving side.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawing in which:

DETAILED DESCRIPTION OF ILLUSTRATIVE EMBODIMENTS

Figure 1:
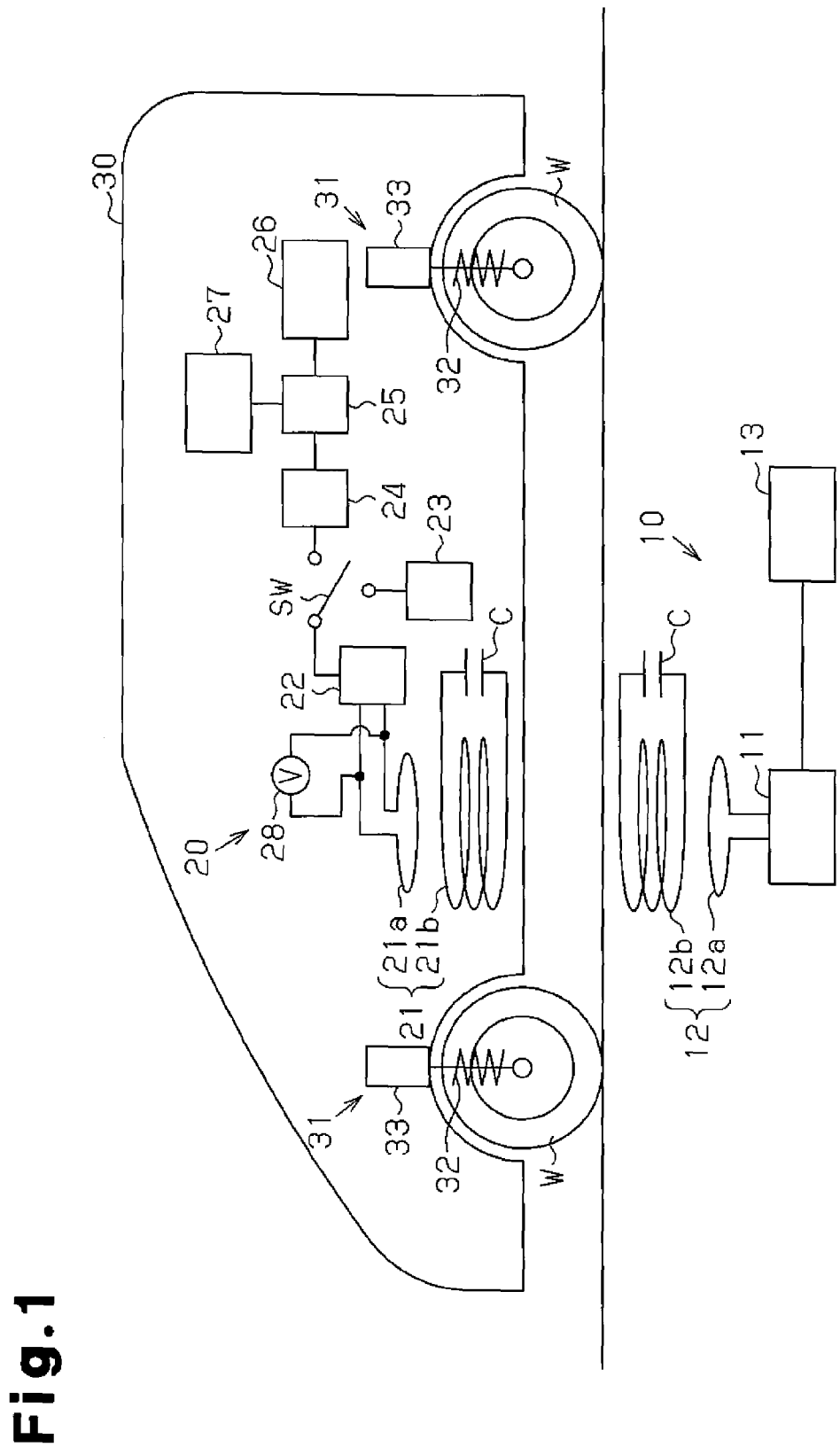
FIG. 1 is a diagram showing a resonance type non-contact power supply system according to one embodiment.

FIG. 1 illustrates a resonance type non-contact power supply system for a vehicle according to one embodiment of the present invention. As shown in FIG. 1, the resonance type non-contact power supply system for a vehicle includes power supplying equipment 10 and an electric vehicle 30. Power receiving equipment 20 is mounted on an electric vehicle 30.

The power supplying equipment 10 is power supplying-side equipment that has a high-frequency power source 11, a primary coil device 12, and a power source controller 13. The high-frequency power source 11 is an alternating-current power source that is controlled based on control signals from the power source controller 13. The high-frequency power source 11 outputs an alternating-current power the frequency of which is equal to a predetermined resonant frequency of the resonance system, for example, a high-frequency power of several MHz.

The primary coil device 12 is a primary-side coil formed by a primary coil 12a and a primary-side resonance coil 12b. The primary coil 12a is connected to the high-frequency power source 11. The primary coil 12a and the primary-side resonance coil 12b are arranged to be coaxial. A capacitor C is connected in parallel to the primary-side resonance coil 12b. The primary coil 12a is coupled to the primary-side resonance coil 12b through electromagnetic induction. The alternating-current power supplied to the primary coil 12a from the high-frequency power source 11 is supplied to the primary-side resonance coil 12b through electromagnetic induction.

The power receiving equipment 20 includes a secondary coil device 21, a matching unit 22, a distance detecting high-frequency power source 23, a rectifier 24, a charger 25, a secondary battery 26, and a control device 27. The secondary battery 26 is a battery serving as an electrical storage device connected to the charger 25. The charger 25 includes a booster circuit that converts the power from the rectifier 24 to a voltage suitable for charging the secondary battery 26.

The secondary coil device 21 is a secondary-side coil formed by a secondary coil 21a and a secondary-side resonance coil 21b. The secondary-side resonance coil 21b receives power from the primary-side resonance coil 12b. The secondary coil 21a and the secondary-side resonance coil 21b are arranged to be coaxial. A capacitor C that is different from the one connected to the primary-side resonance coil 12b is connected to the secondary-side resonance coil 21b. The secondary coil 21a is coupled to the secondary-side resonance coil 21b through electromagnetic induction. The alternating-current power supplied to the secondary-side resonance coil 21b from the primary-side resonance coil 12b is supplied to the secondary coil 21a through electromagnetic induction. The secondary coil 21a is connected to the matching unit 22.

The matching unit 22 is configured to be switched by a switch SW between a state where the matching unit 22 is connected to the distance detecting high-frequency power source 23 and a state where the matching unit 22 is connected to the rectifier 24. The distance detecting high-frequency power source 23 is configured to output an alternating-current power that is smaller approximately by two orders of magnitude than the power output by the high-frequency power source 11 when transmitting power.

A voltage sensor 28 is connected in parallel to the secondary coil 21a. When detecting the distance between the primary-side resonance coil 12b and the secondary-side resonance coil 21b, the control device 27 controls the switch SW to connect the distance detecting high-frequency power source 23 and the matching unit 22 to each other. While the distance detecting high-frequency power source 23 is supplying high-frequency power to the resonance system, the control device 27 detects the distance between the primary-side resonance coil 12b and the secondary-side resonance coil 21b based on a detection signal of the voltage sensor 28. That is, the control device 27 and the voltage sensor 28 form a distance detecting section that detects the distance between the primary-side resonance coil 12b and the secondary-side resonance coil 21b.

The control device 27 includes an on-vehicle CPU and an on-vehicle memory. The on-vehicle memory stores, as a map or a relational expression, data representing the relationship between the distance between the primary-side resonance coil 12b and the secondary-side resonance coil 21b and the input impedance of the resonance system of the time when the distance detecting high-frequency power source 23 outputs an alternating current of a predetermined frequency. The data is obtained by experiments in advance. When detecting the distance between the primary-side resonance coil 12b and the secondary-side resonance coil 21b, the control device 27 measures the input impedance of the resonance system by detecting the voltage between the ends of the secondary coil 21a using the voltage sensor 28. The control device 27 calculates (computes/detects) the distance between the primary-side resonance coil 12b and the secondary-side resonance coil 21b based on the detected input impedance and the map or the relational expression.

The power receiving equipment 20 has a charge state detecting section (not shown) for detecting the charge state of the secondary battery 26. The on-vehicle memory stores, as a map or a relational expression, data representing the relationship between a charging state of the secondary battery 26 in the state where the vehicle is accurately stopped at the predetermined stop position of the power supplying equipment 10 at charging and an adequate impedance of the matching unit 22 that corresponds to the charging state of the secondary battery 26. After charging is started, the control device 27 adjusts the matching unit 22 in correspondence with the charge state of the secondary battery 26.

The electric vehicle 30 has an indicating device (not shown) that indicates whether the detected distance is adequate for allowing the power receiving equipment 20 to efficiently receive power from the power supplying equipment 10 without making contact therewith. The indicating device preferably has a display, which can be visually checked and shows the state of displacement from such an adequate distance. However, the indicating device is not limited to devices that can be visually checked, but may be a device that generates sound that may be monitored. The control device 27 activates the indicating device when the vehicle is being parked at the charging stop position.

The electric vehicle 30 has vehicle height control devices 31. The vehicle height control devices 31 are located between a lower arm supporting wheels W and the vehicle body. As the vehicle height control devices 31, electromagnetic suspensions are known. Each electromagnetic suspension includes a spring 32 and an electromagnetic actuator 33. The spring 32 is located between a wheel W and the vehicle body to absorb impacts from the road surface, thereby improving the ride quality. The electromagnetic actuator 33 generates damping force acting against vertical oscillation of the spring 32. The electromagnetic actuator 33 includes a ball screw mechanism and an electric motor for actuating the ball screw mechanism. The spring 32 may be a coil spring or an air spring device.

During travel of the electric vehicle 30, the vehicle height control devices 31 are controlled by a suspension control device (not shown) to adjust the height of the electric vehicle 30 to a set height. Also, when the vehicle is turning, the vehicle height control devices 31 execute rolling suppression control. When the electric vehicle 30 is stopped at the charging position, the control device 27 controls the current supplied to the vehicle height control devices 31, thereby adjusting the extension state of the electromagnetic actuators 33. In this manner, the control device 27 adjusts the impedance of the resonance system to such a level that the non-contact supply from the power supplying equipment 10 to the power receiving equipment 20 can be efficiently performed.

(Operation)

Operation of the resonance type non-contact charging system configured as described above will now be described.

When charging the secondary battery 26 mounted on the electric vehicle 30, the vehicle needs to be parked (stopped) at the charging position where the distance between the primary-side resonance coil 12b and the secondary-side resonance coil 21b is equal to a predetermined distance. Prior to the non-contact power supply from the power supplying equipment 10 to the power receiving equipment 20, the distance between the primary-side resonance coil 12b and the secondary-side resonance coil 21b is detected. At such a distance detection, the control device 27 switches the switch SW to connect the matching unit 22 and the distance detecting high-frequency power source 23 to each other. In this state, the distance detecting high-frequency power source 23 outputs alternating-current power having a predetermined frequency. At this time, the output of the distance detecting high-frequency power source 23 is not supplied to the charger 25, but supplied to the secondary-side resonance coil 21b. Therefore, the input impedance of the resonance system is not influenced by the charger 25 or the charging state of the secondary battery 26. In this state, the control device 27 calculates the input impedance of the secondary coil 21a based on the detection signal of the voltage sensor 28, and detects (calculates) the distance between the primary-side resonance coil 12b and the secondary-side resonance coil 21b based on the value of the input impedance and the map or the relational expression.

The electric vehicle 30 is moved until the detected distance is equal to a distance suitable for charging. Even if the electric vehicle 30 is parked at the charging position, the distance between the primary-side resonance coil 12b and the secondary-side resonance coil 21b can be different from the distance optimal for non-contact power supply depending on the condition of the electric vehicle 30, for example, the loading state or tire air pressure. Accordingly, the control device 27 next uses the vehicle height control devices 31 to adjust the impedance of the resonance system, which includes the primary-side resonance coil 12b and the secondary-side resonance coil 21b. Specifically, the control device 27 activates the electric motor of the electromagnetic actuators 33 to adjust the vehicle height such that the impedance of the resonance system allows power to be efficiently supplied from the power supplying equipment 10 to the power receiving equipment 20. When the height adjustment is complete, the control device 27 sends a power supply request signal to the power source controller 13 through a wireless communication device. When receiving the power supply request signal from the control device 27, the power source controller 13 starts supplying power.

When the high-frequency power source 11 of the power supplying equipment 10 applies an alternating voltage of the resonant frequency to the primary coil 12a, power is supplied from the primary-side resonance coil 12b to the secondary-side resonance coil 21b through non-contact resonance. The power received by the secondary-side resonance coil 21b is then supplied to the charger 25 via the secondary coil 21a, the matching unit 22, and the rectifier 24. The charger 25 converts the voltage of the power to a value suitable for charging the secondary battery 26. The secondary battery 26, which is connected to the charger 25, is then charged via the power.

When the secondary battery 26 is being charged, the impedance of the resonance system changes due to changes in the charge state of the secondary battery 26. If the impedance of the high-frequency power source 11 and the input impedance of the resonance system no longer match because of such changes, the reflected power to the high-frequency power source 11 increases. This hinders efficient supply of power (power supply) from the power supplying equipment 10 to the power receiving equipment 20. However, during charging, the control device 27 of the present embodiment adjusts the impedance of the matching unit 22 to an adequate value in accordance with the charge state of the secondary battery 26, so that power is efficiently supplied to the power receiving equipment 20 from the power supplying equipment 10 and charging is efficiently performed even if the charging state of the secondary battery 26 changes during charging.

For example, the control device 27 determines that the charging is complete based on time elapsed since the voltage of the secondary battery 26 reaches a predetermined voltage. When the charging is complete, the control device 27 sends a charging complete signal to the power source controller 13. The power source controller 13 stops the power transmission when receiving the charging completion signal.

The present embodiment has the following advantages.
(1) The resonance type non-contact power supply system for a vehicle includes the power supplying equipment 10 and the electric vehicle 30. The electric vehicle 30 includes the power receiving equipment 20 and the vehicle height control devices 31. The power supplying equipment 10 includes the high-frequency power source 11 and the primary-side resonance coil 12b, which receives power from the high-frequency power source 11. The power receiving equipment 20 includes the secondary-side resonance coil 21b, which receives power from the primary-side resonance coil 12b, the rectifier 24, which rectifies the power supplied to the secondary-side resonance coil 21b, the charger 25, which receives the power that has been rectified by the rectifier 24, the secondary battery 26 connected to the charger 25, and the control device 27. During charging of the secondary battery 26, the resonance type non-contact power supply system uses the vehicle height control devices 31 to adjust the impedance of the resonance system, which includes the primary-side resonance coil 12b and the secondary-side resonance coil 21b. Thus, even if the condition of the electric vehicle 30, for example, the loading state or the tire air pressure varies, the resonance type non-contact power supply system for a vehicle uses the vehicle height control devices 31 to efficiently supply power from the power supplying equipment 10 to the power receiving equipment 20.
(2) The power receiving equipment 20 includes the matching unit 22 capable of adjusting the impedance of the resonance system. The impedance of the secondary battery 26 changes according to the charge state during charging. If such changes in the impedance of the secondary battery 26 are neglected, the impedance of the resonance system becomes displaced from a value suitable for efficient non-contact charging. Therefore, the impedance of the resonance system needs to be adjusted to a value that allows the non-contact charging to be efficiently performed according to the charge state of the secondary battery 26 during charging. Accordingly, the control device 27 of the present embodiment adjusts the impedance of the matching unit 22, thereby adjusting the impedance of the resonance system to a value that allows the non-contact charging to be efficiently executed. If the height of the electric vehicle 30 is adjusted by using the vehicle height control devices 31 to change the distance between the primary-side resonance coil 12b and the secondary-side resonance coil 21b, the impedance of the resonance system can be adjusted. However, the adjustment can be easily and accurately executed by adjusting the impedance of the matching unit 22.
(3) When the distance between the primary-side resonance coil 12b and the secondary-side resonance coil 21b is detected based on the impedance of the resonance system, the distance detecting high-frequency power source 23 of the power receiving equipment 20 supplies high-frequency power to the resonance system. Therefore, the present embodiment consumes less power compared to, for example, a configuration in which the distance between the resonance coils 12b and 21b is detected in a state where the power supplying equipment 10 supplies high-frequency power that is the same as the power supplied for charging.
(4) The electric vehicle 30 has the distance detecting section and the indicating device. The distance detecting section detects the distance between the primary-side resonance coil 12b and the secondary-side resonance coil 21b based on the impedance of the resonance system. When the distance between the primary-side resonance coil 12b and the secondary-side resonance coil 21b is detected, the indicating device indicates whether the detected distance is a distance suitable for efficient non-contact power supply from the power supplying equipment 10. That is, the indicating device allows the driver of the electric vehicle 30 to judge whether the vehicle 30 has moved to a position (charging position) where the non-contact power supply can be efficiently executed from the power supplying equipment 10. The driver therefore can easily move the electric vehicle 30 to the charging position and stop the vehicle 30 there.
(5) The power receiving equipment 20 has the matching unit 22 and the charging state detecting section for detecting the charging state of the secondary battery 26. Even if the impedance of the secondary battery 26 changes in accordance with the charge state during charging, the control device 27 adjusts the matching unit 22 such that the impedance of the resonance system is set to a value that allows non-contact charging to be efficiently executed. Therefore, the control device 27 is capable of executing efficient charging even if the charge state of the secondary battery 26 changes.

The present invention is not restricted to the illustrated embodiments but may be embodied in the following forms.

When detecting the distance between the resonance coils 12b, 21b, the control device 27 switches the switch SW to connect the matching unit 22 and the rectifier 24 to each other when the detected distance becomes a distance suitable for charging. When the vehicle height control devices 31 adjust the impedance of the resonance system, the high-frequency power source 11 of the power supplying equipment 10 may supply high-frequency power. In this case, the impedance of the resonance system is adjusted in a state where the power supplying equipment 10 performs non-contact power supply during charging. Accordingly, the impedance adjustment is executed further adequately.

A method is disclosed in which it is determined, based on the impedance of the resonance system, whether the distance between the primary-side resonance coil 12b and the secondary-side resonance coil 21b is in a range that allows power supply to be executed efficiently. In this method, the high-frequency power source 11 may output high-frequency power to the resonance system, instead the distance detecting high-frequency power source 23 installed in the power receiving equipment 20. In this case, the relationship between the output voltage of the secondary coil 21*a* and the impedance of the resonance system is obtained and prepared as data, and stored, for example, in the on-vehicle memory of the control device 27. The control device 27 determines whether the distance between the primary-side resonance coil 12*b* and the secondary-side resonance coil 21*b* is in a range that allows power supply to be efficiently performed based on the output voltage of the secondary coil 21*a*.

Instead of arranging the primary coil 12*a* and the primary-side resonance coil 12*b* of the power supplying equipment 10, and the secondary coil 21*a* and the secondary-side resonance coil 21*b* of the power receiving equipment 20 such that the axes of the coils are perpendicular to the ground surface, the coils may be arranged such that the axes extend horizontally. In this case, also, the axes of the coils may be displaced from each other depending on the condition of the electric vehicle 30, that is, the loading state or the tire air pressure. In other words, the impedance of the resonance system may have a value different from the value that allows power supply to be efficiently performed. In such a case, the vehicle height control devices 31 are used to adjust the impedance of the resonance system to an adequate value.

To perform non-contact power supply between the power supplying equipment 10 and the power receiving equipment 20, the resonance type non-contact power supply system does not necessarily include all of the primary coil 12*a*, the primary-side resonance coil 12*b*, the secondary coil 21*a*, and the secondary-side resonance coil 21*b*. The resonance type non-contact power supply system only needs to have at least the primary-side resonance coil 12*b* and the secondary-side resonance coil 21*b*. That is, instead of forming the primary coil device 12 by the primary coil 12*a* and the primary-side resonance coil 12*b*, the primary coil 12*a* may be omitted and the primary-side resonance coil 12*b* may be connected to the high-frequency power source 11. Likewise, instead of forming the secondary coil device 21 by the secondary coil 21*a* and the secondary-side resonance coil 21*b*, the secondary coil 21*a* may be omitted and the secondary-side resonance coil 21*b* may be connected to the rectifier 24, for example, via the matching unit 22. However, a resonance system of a configuration with all of the primary coil 12*a*, the primary-side resonance coil 12*b*, the secondary coil 21*a*, and the secondary-side resonance coil 21*b* is easier to be adjusted to a resonance state. Further, when the distance between the primary-side resonance coil 12*b* and the secondary-side resonance coil 21*b* is great, a resonance system of a configuration with all of the primary coil 12*a*, the primary-side resonance coil 12*b*, the secondary coil 21*a*, and the secondary-side resonance coil 21*b* can more easily maintain the resonance state.

In a case where the secondary coil 21*a* is omitted, the voltage sensor 28, which forms the distance detecting sections, detects the voltage between the ends of the secondary-side resonance coil 21*b*. The control device 27 detects the distance between the primary-side resonance coil 12*b* and the secondary-side resonance coil 21*b* from a map or a relational expression representing the relationship between the value of the voltage and the distance between the primary-side resonance coil 12*b* and the secondary-side resonance coil 21*b*.

The matching unit 22 of the power receiving equipment 20 may be omitted. However, with the matching unit 22, the impedance of the resonance system can be more finely adjusted, so that power is more efficiently supplied from the supplying side to the receiving side.

The power supplying equipment 10 may have a termination resistor that can be connected to the resonance system via a second switch. For example, the second switch is configured to be selectively switched by a command from the power source controller 13 between a state in which the second switch connects the primary coil device 12 to the high-frequency power source 11 and a state in which the second switch connects the primary coil device 12 to the terminal resistor. When the power receiving equipment 20 detects the distance between the primary-side resonance coil 12*b* and the secondary-side resonance coil 21*b*, the second switch is switched to the state in which it connects the primary coil device 12 to the terminal resistor. When the high-frequency power source 11 supplies power, the second switch is switched to the state in which it connects the primary coil device 12 to the high-frequency power source 11. Thus, when the power receiving equipment 20 detects the distance, the resonance system is disconnected from the high-frequency power source 11 and connected to the terminal resistor. This eliminates the influence of the high-frequency power source 11 on the impedance of the resonance system. This improves the accuracy of the detection of the distance between the primary-side resonance coil 12*b* and the secondary-side resonance coil 21*b*.

In a case where the primary coil device 12 of the power supplying equipment 10 includes both of the primary coil 12*a* and the primary-side resonance coil 12*b*, the second switch may be switched between a state where it connects the primary coil 12*a* with the terminal resistor and a state where it connects the primary coil 12*a* with the high-frequency power source 11. In a case where the primary coil device 12 does not include the primary coil 12*a*, but has only the primary-side resonance coil 12*b*, the second switch may be switched between a state where it connects the primary-side resonance coil 12*b* with the terminal resistor and a state where it connects the primary-side resonance coil 12*b* with the high-frequency power source 11. Alternatively, in a case where a primary matching unit is located between the primary coil device 12 and the high-frequency power source 11, the second switch is located between the primary matching unit and the high-frequency power source 11. When the power receiving equipment 20 detects the distance between the primary-side resonance coil 12*b* and the secondary-side resonance coil 21*b*, the second switch is switched to the state in which it connects the primary matching unit and the terminal resistor to each other. When the high-frequency power source 11 supplies power, the second switch is switched to the state in which it connects the primary rectifier and the high-frequency power source 11 to each other.

The electric vehicle 30 is not limited to a vehicle that requires a driver, but may be an unmanned carrier.

The rectifier 24 and the charger 25 do not need to be independent from each other. The charger 25 may incorporate the rectifier 24.

The electrical storage device can by any type of direct-current power source that can be charged and discharged. The electrical storage device is not limited to a secondary battery 26, but may be a capacitor of a large capacitance.

The high-frequency power source 11 may be configured such that the frequency of the output alternating-current voltage is variable or invariable (constant).

The charger 25 does not need to have a booster circuit. For example, the charger 25 may be configured to charge the secondary battery 26 with alternating current output by the secondary coil device 21 after only rectifying the alternating current.

The primary-side resonance coil 12b and the secondary-side resonance coil 21b are not limited to structures formed by helically winding wires. The primary-side resonance coil 12b and the secondary-side resonance coil 21b may have a structure formed by spirally winding a wire in a single plane.

The capacitors C connected to the primary-side resonance coil 12b and the secondary-side resonance coil 21b may be omitted. However, a configuration with capacitors C connected to the primary-side resonance coil 12b and the secondary-side resonance coil 21b lowers the resonant frequency compared to a configuration without capacitors C. If the resonant frequency is the same, the primary-side resonance coil 12b and the secondary-side resonance coil 21b can be reduced in size if capacitors C are connected to the primary-side resonance coil 12b and the secondary-side resonance coil 21b, compared to a case where the capacitors C are omitted.

What is claimed is:

1. A resonance type non-contact power supply system, the system comprising power supplying equipment and an electric vehicle, wherein
    the power supplying equipment includes an alternating-current power source and a primary-side resonance coil for receiving power from the alternating-current power source,
    the electric vehicle includes power receiving equipment and a vehicle height control device mounted on the electric vehicle,
    the power receiving equipment includes a secondary-side resonance coil that receives power from the primary-side resonance coil, a rectifier that rectifies the power received by the secondary-side resonance coil, and an electrical storage device, to which the power rectified by the rectifier is supplied, and
    a resonance system, which includes the primary-side resonance coil and the secondary-side resonance coil, in which the resonance system is configured such that impedance thereof is adjusted by the use of the vehicle height control device when the electrical storage device is being charged.

2. The resonance type non-contact power supply system for a vehicle according to claim 1, comprising a matching unit that adjusts the impedance of the resonance system.

3. The resonance type non-contact power system for a vehicle according to claim 1, wherein
    the power receiving equipment includes a distance detecting high-frequency power source and a distance detecting section, and
    the distance detecting section detects the distance between the secondary-side resonance coil and the primary-side resonance coil based on the input impedance of the resonance system in a state where the distance detecting high-frequency power source outputs high-frequency power.

4. The resonance type non-contact power system for a vehicle according to claim 1, wherein
    the power receiving equipment includes a control device that adjusts the matching unit, and
    the control device is configured to adjust the matching unit during charging of the electrical storage device based on data representing the relationship between the charge state of the electrical storage device and an adequate impedance of the matching unit that corresponds to the charge state.

5. An electric vehicle for use with an alternating-current power source provided in non-contact power supply equipment via a primary-side resonance coil, the electric vehicle comprising power receiving equipment and a vehicle height control device, wherein
    the power receiving equipment is configured to receive power supplied from the alternating-current power source provided in the non-contact power supply equipment via the primary-side resonance coil,
    the power receiving equipment includes: a secondary-side resonance coil that receives power from the primary-side resonance coil, a rectifier that rectifies the power received by the secondary-side resonance coil, and an electrical storage device, to which the power rectified by the rectifier is supplied, and
    a resonance system, which includes the primary-side resonance coil and the secondary-side resonance coil, in which the resonance system is configured such that impedance thereof is adjusted by the use of the vehicle height control device when the electrical storage device is being charged.

6. The electric vehicle according to claim 5, wherein
    the power receiving equipment includes a distance detecting high-frequency power source and a distance detecting section, and
    the distance detecting section detects the distance between the secondary-side resonance coil and the primary-side resonance coil based on the input impedance of the resonance system in a state where the distance detecting high-frequency power source outputs high-frequency power.

7. The electric vehicle according to claim 5, wherein
    the power receiving equipment includes a control device that adjusts the matching unit, and
    the control device adjusts the matching unit during charging of the electrical storage device based on data representing the relationship between the charge state of the electrical storage device and an adequate impedance of the matching unit that corresponds to the charge state.

* * * * *